(12) United States Patent
Samprathi et al.

(10) Patent No.: US 10,609,177 B2
(45) Date of Patent: Mar. 31, 2020

(54) CONSOLIDATED CLOUD SYSTEM FOR VIRTUAL MACHINE

(71) Applicant: Nutanix, Inc., San Jose, CA (US)

(72) Inventors: Ravikanth Samprathi, San Jose, CA (US); Steven Poitras, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 96 days.

(21) Appl. No.: 15/884,825

(22) Filed: Jan. 31, 2018

(65) Prior Publication Data

US 2019/0238656 A1 Aug. 1, 2019

(51) Int. Cl.
  *H04L 29/08* (2006.01)
  *G06F 9/50* (2006.01)
  *G06F 9/455* (2018.01)

(52) U.S. Cl.
  CPC .......... *H04L 67/32* (2013.01); *G06F 9/45558* (2013.01); *G06F 9/5077* (2013.01); *H04L 67/10* (2013.01); *H04L 67/1097* (2013.01); *H04L 67/2823* (2013.01); *G06F 2009/45595* (2013.01)

(58) Field of Classification Search
  CPC ....... H04L 67/32; H04L 67/10; G06F 9/5077; G06F 9/45558; G06F 2009/45595
  See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,713,147 B2* | 4/2014 | Ferris | G06Q 30/02 709/223 |
| 8,850,130 B1 | 9/2014 | Aron et al. | |
| 9,251,164 B2* | 2/2016 | Doshi | G06F 16/182 |
| 9,772,866 B1 | 9/2017 | Aron et al. | |
| 9,853,913 B2 | 12/2017 | Foskett et al. | |
| 2010/0042720 A1* | 2/2010 | Stienhans | G06F 9/5072 709/226 |
| 2010/0325199 A1* | 12/2010 | Park | G06F 16/10 709/203 |
| 2011/0153727 A1 | 6/2011 | Li | |
| 2011/0231899 A1* | 9/2011 | Pulier | G06F 9/45558 726/1 |

(Continued)

FOREIGN PATENT DOCUMENTS

| | | | |
|---|---|---|---|
| CN | 103092670 A | 5/2013 | |
| CN | 103118125 A | 5/2013 | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Joe Chacko
(74) *Attorney, Agent, or Firm* — Foley & Lardner LLP

(57) ABSTRACT

Disclosed herein are related to a method, a system, and a non-transitory computer readable medium for providing a consolidated cloud system. The consolidated cloud system includes a plurality of cloud systems. A user request to access content in the consolidated cloud system is received, where the content is stored by a target cloud system of the plurality of cloud systems. The content from the target cloud system is retrieved, and the content is provided as part of the consolidated cloud system. The device generating the user request may be unaware of which cloud system stores the content.

26 Claims, 5 Drawing Sheets

(56) References Cited

U.S. PATENT DOCUMENTS

| | | | | |
|---|---|---|---|---|
| 2012/0042162 A1* | 2/2012 | Anglin | ................... | G06F 21/57 |
| | | | | 713/165 |
| 2012/0136960 A1* | 5/2012 | Liu | ................... | G06F 16/1752 |
| | | | | 709/217 |
| 2012/0311157 A1 | 12/2012 | Erickson et al. | | |
| 2014/0164449 A1* | 6/2014 | Kim | ..................... | G06F 16/188 |
| | | | | 707/827 |

OTHER PUBLICATIONS

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 3, 2017), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Cano, Ignacio, et al. "Curator: Self-Managing Storage for Enterprise Clusters" (Mar. 27, 2017) from https://www.usenix.org/conference/nsdi17/.

* cited by examiner

CONSOLIDATED CLOUD SYSTEM FOR VIRTUAL MACHINE

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The one or more virtual machines utilize the hardware resources of the underlying one or more host machines. Each virtual machine may be configured to run an instance of an operating system.

In some implementations, virtual computing systems may be implemented on various cloud systems. For example, virtual machine images, metadata associated with virtual machines, or volume data associated with virtual machine may be stored by various cloud systems. However, different cloud systems may operate based on different protocols, different application programming interfaces (API's), or different software defined kit (SDK) packages. Accordingly, virtual machine operating based on one cloud system may not be compatible with another cloud system.

Figure 1:
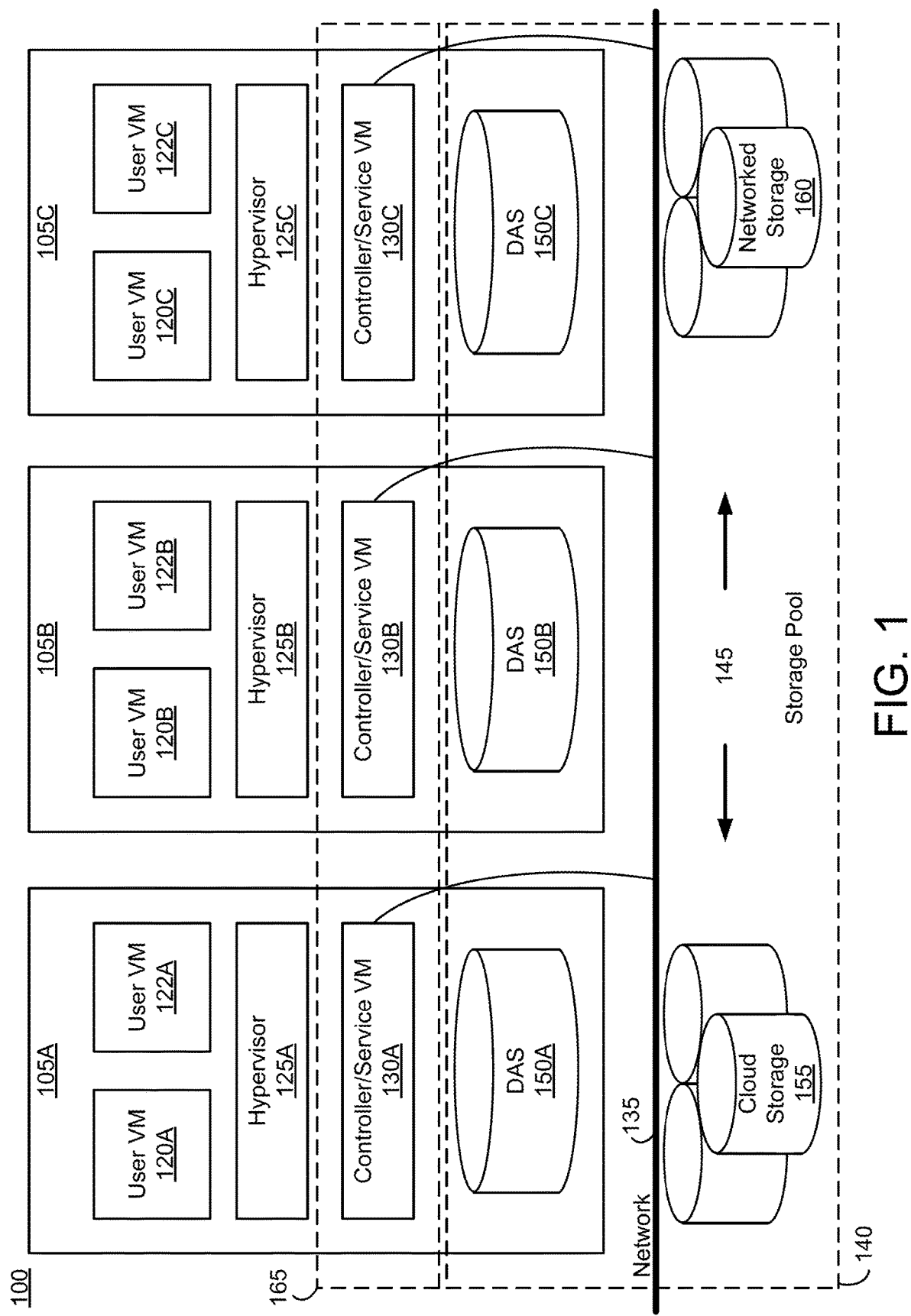
FIG. 1 is a block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Various embodiments disclosed herein are related to a method, a system, and a non-transitory computer readable medium for providing a consolidated cloud system. The consolidated cloud system includes a plurality of cloud systems. In some embodiments, a user request to access content in the consolidated cloud system is received, where the content is stored by a target cloud system of the plurality of cloud systems. The content may be virtual machine image to operate a virtual machine. The content from the target cloud system is retrieved, and the content is provided as part of the consolidated cloud system. In one aspect, the device generating the user request may be unaware of which cloud system stores the content.

In some embodiments, the target cloud system includes two or more cloud systems from the plurality of cloud systems, where the content includes a first portion stored by one of the two or more cloud systems and a second portion stored by another one of the two or more cloud systems. A device generating the user request may be unaware of the first portion being stored by the one of the two or more cloud systems and the second portion being stored by the another one of the two or more cloud systems.

In some embodiments, the user request conforming to a first application programming interface is received, and converted into a second application programming interface of the target cloud system. The converted user request conforming to the second application programming interface may be transmitted to the target cloud system.

In some embodiments, content is stored by a particular cloud system according to characteristics or specification (e.g., storage or operating speed requirements) of the content. Characteristics of the content to be stored may be determined, and one or more cloud systems from the plurality of cloud systems having capabilities matching the characteristics of the content to be stored may be determined. In addition, the content may be stored by the determined one or more cloud systems. Accordingly, content may be stored by a cloud system according to storage or operating speed requirements.

Advantageously, a disclosed consolidated cloud system herein enables different cloud systems to operate together in a seamless manner. In one aspect, the disclosed consolidated cloud system operates based on a request or a command conforming to a standard format (e.g., API, SDK, protocol, etc.), and converts the request or command into a corresponding format for a particular cloud system. Thus, data or content may appear to be stored by a single cloud system or a virtual machine may appear to operate on a single cloud system, where different cloud systems operate together in different formats (e.g., API, SDK, protocol, etc.) in backend.

Referring now to FIG. 1, a virtual computing system 100 is shown, in accordance with some embodiments of the present disclosure. The virtual computing system 100 includes a plurality of nodes 105A, 105B, 105C. Each of the nodes 105A, 105B, 105C includes user virtual machines (VMs) 120, 122, and a hypervisor 125 configured to create and run the user VMs. Each of the nodes 105 also includes a controller/service VM 130 that is configured to manage, route, and otherwise handle workflow requests to and from the user VMs 120 of a particular node. The controller/service VM 130 is connected to a network 135 to facilitate communication between the nodes 105. Although not shown, in some embodiments, the hypervisor 125 may also be connected to the network 135. In other embodiments, each node 105 includes more, fewer or different components than shown in FIG. 1. For example, the node 105 includes a single VM, or any number of VMs.

The virtual computing system 100 may also include a storage pool 140. The storage pool 140 may include network-attached storage 145 and direct-attached storage 150. The network-attached storage 145 may be accessible via the network 135 and, in some embodiments, may include cloud storage 155, as well as local storage area network 160. In contrast to the network-attached storage 145, which is accessible via the network 135, the direct-attached storage 150 may include storage components that are provided within each of the nodes 105, such that each of the nodes 105 may access its respective direct-attached storage 150 without having to access the network 135.

It is to be understood that certain components of the virtual computing system 100 are shown in FIG. 1. Nevertheless, several other components that are commonly provided or desired in a virtual computing system are contemplated and considered within the scope of the present disclosure. Additional features of the virtual computing system 100 are described in U.S. Pat. No. 8,601,473, which is incorporated by reference herein in its entirety.

Although three of the plurality of nodes 105A, 105B, 105C are shown in the virtual computing system 100, in other embodiments, greater than or fewer than three nodes may be employed. Likewise, although two of the user VMs 120, 122 are shown on each of the nodes 105, in other embodiments, the number of the user VMs on any of the nodes 105 may vary to include either a single user VM or more than two user VMs. Further, the nodes 105 may have different number of the user VMs 120, 122. Additionally, more than a single instance of the hypervisor 125 and/or the controller/service VM 130 may be provided on one or more of the nodes 105A, 105B, 105C.

In some embodiments, each of the nodes 105A, 105B, 105C may be a hardware device, such as a server. For example, in some embodiments, one or more of the nodes 105A, 105B, 105C may be an NX-1000 server, NX-3000 server, NX-6000 server, NX-8000 server, etc., provided by Nutanix, Inc. or server computers from Dell, Inc., Lenovo Group Ltd. or Lenovo PC International, Cisco Systems, Inc., etc. In other embodiments, one or more of the nodes 105A, 105B, 105C may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the nodes 105A, 105B, 105C may also be configured to communicate and share resources with each other via the network 135. For example, in some embodiments, the nodes 105A, 105B, 105C may communicate and share resources with each other via the controller/service VM 130 and/or the hypervisor 125. One or more of the nodes 105A, 105B, 105C may also be organized in a variety of network topologies, and may be termed as a "host" or "host machine."

Also, although not shown, one or more of the nodes 105A, 105B, 105C may include one or more processing units configured to execute instructions. The instructions may be carried out by a special purpose computer, logic circuits, or hardware circuits of the nodes 105A, 105B, 105C. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 140, as well as with other elements of the respective nodes 105 to receive, send, and process information, and to control the operations of the underlying first, second, or third node. The processing units may retrieve a set of instructions from the storage pool 140, such as, from a permanent memory device like a read only memory (ROM) device and copy the instructions in an executable form to a temporary memory device that is generally some form of random access memory (RAM). The ROM and RAM may both be part of the storage pool 140, or in some embodiments, may be separately provisioned from the storage pool. Further, the processing units may include a single stand-alone processing unit, or a plurality of processing units that use the same or different processing technology.

With respect to the storage pool 140 and particularly with respect to the direct-attached storage 150, it may include a variety of types of memory devices. For example, in some embodiments, the direct-attached storage 150 may include, but is not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. Likewise, the network-attached storage 145 may include any of a variety of network accessible storage (e.g., the cloud storage 155, the local storage area network 160, etc.) that is suitable for use within the virtual computing system 100 and accessible via the network 135. The storage pool 140 including the network-attached storage 145 and the direct-attached storage 150 may together form a distributed storage system configured to be accessed by each of the nodes 105 via the network 135 and the controller/service VM 130, and/or the hypervisor 125. In some embodiments, the various storage components in the storage pool 140 may be configured as virtual disks for access by the user VMs 120.

Each of the user VMs 120 is a software-based implementation of a computing machine in the virtual computing system 100. The user VMs 120 emulate the functionality of a physical computer. Specifically, the hardware resources, such as processing unit, memory, storage, etc., of the underlying computer (e.g., the nodes 105) are virtualized or transformed by the hypervisor 125 into the underlying support for each of the plurality of user VMs 120 that may run its own operating system and applications on the underlying physical resources just like a real computer. By encapsulating an entire machine, including CPU, memory, operating system, storage devices, and network devices, the user VMs 120 are compatible with most standard operating systems (e.g. Windows, Linux, etc.), applications, and device drivers. Thus, the hypervisor 125 is a virtual machine monitor that allows a single physical server computer (e.g., the nodes 105) to run multiple instances of the user VMs 120, with each user VM sharing the resources of that one physical server computer, potentially across multiple environments. By running the plurality of user VMs 120 on each of the nodes 105, multiple workloads and multiple operating systems may be run on a single piece of underlying hardware computer (e.g., the nodes 105) to increase resource utilization and manage workflow.

The user VMs 120 are controlled and managed by the controller/service VM 130. The controller/service VM 130 of each of the nodes 105 is configured to communicate with each other via the network 135 to form a distributed system 165. The hypervisor 125 of each of the nodes 105 may be configured to run virtualization software, such as, ESXi from VMWare, AHV from Nutanix, Inc., XenServer from Citrix Systems, Inc., etc., for running the user VMs 120 and for managing the interactions between the user VMs and the underlying hardware of the nodes 105. The controller/service VM 130 and the hypervisor 125 may be configured as suitable for use within the virtual computing system 100.

The network 135 may include any of a variety of wired or wireless network channels that may be suitable for use within the virtual computing system 100. For example, in some embodiments, the network 135 may include wired connections, such as an Ethernet connection, one or more twisted pair wires, coaxial cables, fiber optic cables, etc. In other embodiments, the network 135 may include wireless connections, such as microwaves, infrared waves, radio waves, spread spectrum technologies, satellites, etc. The network 135 may also be configured to communicate with another device using cellular networks, local area networks, wide area networks, the Internet, etc. In some embodiments, the network 135 may include a combination of wired and wireless communications.

In some embodiments, one of the nodes 105 may be configured as a leader node. The leader node may be configured to monitor and handle requests from other nodes in the virtual computing system 100. If the leader node fails, another leader node may be designated. Furthermore, one or more of the nodes 105 may be combined together to form a network cluster (also referred to herein as simply "cluster"). Generally speaking, all of the nodes 105 in the virtual computing system 100 may be divided into one or more clusters. One or more components of the storage pool 140 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120 that are part of a cluster may be configured to share resources with each other. In some embodiments, multiple clusters may share resources with one another.

Further, as shown herein, one or more of the user VMs 120 may be configured to have a search computing system. In some embodiments, the search computing system may be provided on one or more of the user VMs 120 of the leader node, while in other embodiments, the search computing system may be provided on another node. In some embodiments, the search computing system may be provided on a user virtual machine that is separate from but associated with the user VMs 120. For example, in some embodiments, the search computing system may be provided on a user virtual machine that is configured to manage the various clusters and elements within the various clusters of the virtual computing system 100. In some embodiments, the search computing system may reside on the controller/service VM 130. Thus, the search computing system may be configured to reside on a variety of components within the virtual computing system 100 as desired.

In one or more embodiments, the virtual computing system 100 may operate as a consolidated cloud system to access the resources (e.g., storage, processing unit, etc.) of different cloud systems (or different cloud storage). The cloud storage 155 or one or more of the nodes 105 may be operated by different cloud service providers. For example, a cloud storage 155 may be AWS S3 data storage from AMAZON, OnMetal data storage from Rackspace, Azure database from StorSimple, Google cloud storage from Google, Xi cloud storage from NuTanix, etc. Different cloud systems may be optimized for different characteristics. For example, one cloud system may be more efficient for SQL database, where another cloud system may be more efficient in terms of cost per storage, and another cloud system may be more efficient in terms of operation speed.

In one aspect, the consolidated cloud system allows different cloud systems to operate in a seamless manner. In one aspect, different cloud systems operate based on different formats (e.g., API, SDK, protocol, etc.). The disclosed consolidated cloud system herein operates based on a request or a command conforming to a standard format (e.g., API, SDK, protocol, etc.), and converts the request or command into a corresponding format for a particular cloud system. Thus, content may appear to be stored on a single cloud system or a virtual machine may appear to operate on a single cloud system, where different cloud systems operate together in different formats (e.g., API, SDK, protocol, etc.). Accordingly, a user device generating the request or command may be generated in a standard format, without knowing different formats employed by different cloud systems.

Figure 2:
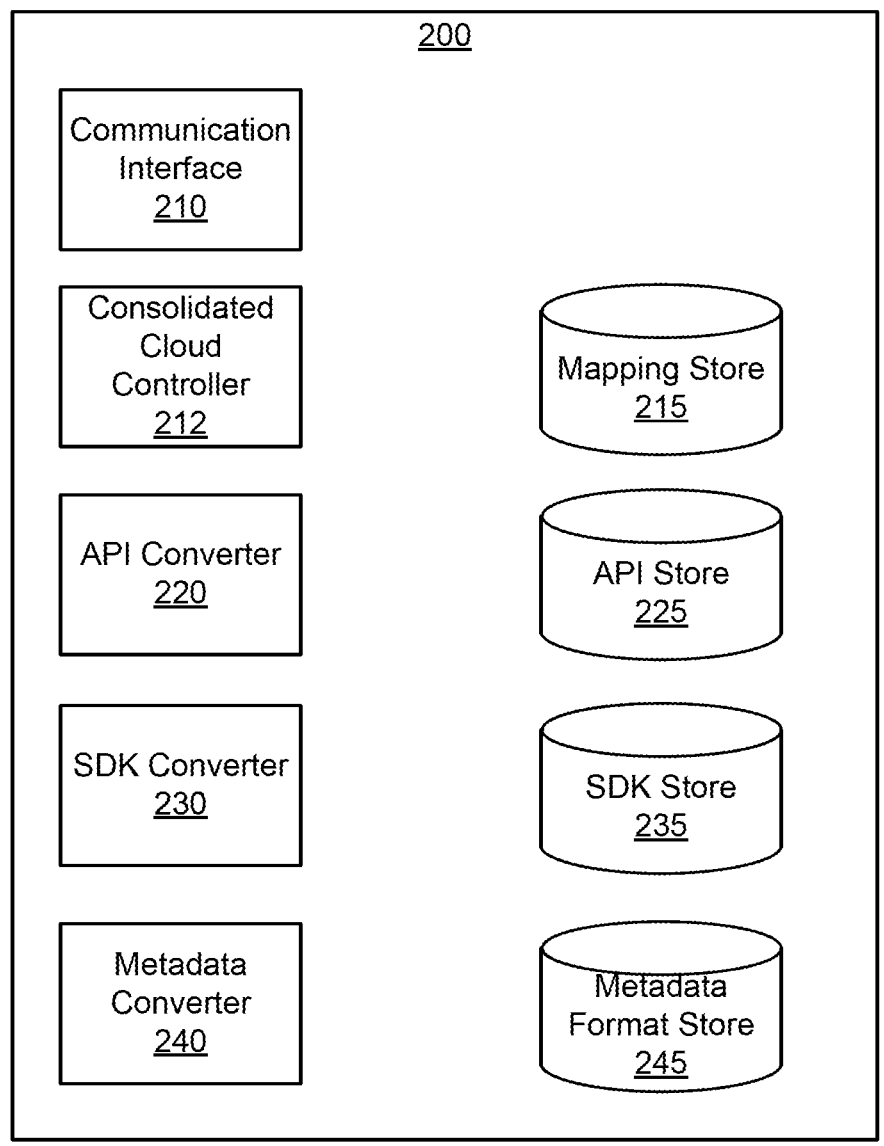
FIG. 2 is a block diagram of an example interface cloud system, in accordance with some embodiments of the present disclosure.

Referring to FIG. 2, illustrated is a block diagram of an example interface cloud system 200, in accordance with some embodiments of the present disclosure. In some embodiments, the interface cloud system 200 includes a communication interface 210, a consolidated cloud controller 212, a mapping store 215, an API converter 220, an API store 225, a SDK converter 230, a SDK store 235, a metadata converter 240, and a metadata format store 245. These components operate together as an interface between a user device and various cloud systems. A user device is a computing device (e.g., one of the nodes 105) operated by a user. The interface cloud system 200 may be embodied as one of the components (e.g., user VM, 120, hypervisor 125, controller service VM 130, or a combination of them) of a node 105. In some embodiments, the interface cloud system 200 includes more, fewer, or different components than shown in FIG. 2.

In one aspect, the interface cloud system 200 receives requests or commands from the user device to store or access data or to operate one or more virtual machines on a consolidated cloud system including the various cloud systems. Different data may be stored across different cloud systems, but the user device may be unaware of how data is actually stored by various cloud systems. Instead, data may appear to be stored by a single cloud system to the user device. In one approach, the interface cloud system 200 communicates with the user device in a standard format. The standard format is a format of a communication employed by the user device to store content at or access content stored by a consolidated cloud system herein. Examples for the standard format include standard API, standard SDK, standard metadata, etc. To integrate various cloud systems that may operate based on different formats (e.g., API's, SDK packages, metadata formats, etc.), the interface cloud system 200 converts communication with the user device in the standard communication format into corresponding formats of corresponding cloud systems for seamless operation of the consolidated cloud system.

The communication interface 210 is a component that interfaces the network 135. The communication interface 210 may receive instructions or commands from the user device in the standard format, and forwards the instructions or commands to various components within the interface cloud system 200. Moreover, the communication interface 210 receives instructions or commands from various components within the interface cloud system 200, and forwards the instructions or commands to the one or more cloud systems in corresponding formats.

The consolidated cloud controller 212 is a component that aggregates different cloud systems, and presents an image of a single cloud system to the user device. In some embodiments, the consolidated cloud controller 212 receives a user request to store content (e.g., virtual machine images, virtual machine metadata, etc.), and determines characteristics or specification of the content. For example, the consolidated cloud controller 212 determines a speed requirement to access the content, data size of the content, data format, data type, etc. The consolidated cloud controller 212 may further determine one or more cloud systems from the plurality of cloud systems having capabilities matching the characteristics of the content to be stored. The consolidated cloud controller 212 may store the content at the determined one or more cloud systems through the communication interface 210, and generate a mapping table indicating which content is stored at which cloud system. The mapping table may also indicate a format of communication employed by the cloud system. The consolidated cloud controller 212 may store the mapping table by the mapping store 215. In response to a user request to access stored content, the consolidated cloud controller 212 may identify a cloud system storing the requested content in the mapping table, and retrieve the requested content from the identified cloud system indicated by the mapping table, and forwards the retrieved content to the user device. In one configuration, the mapping table is not shared with the user device, and the consolidated cloud controller 212 allows the user device to store content to or access content from, as if, a single cloud system.

The API converter 220 is a component that converts instructions or commands in different APIs. For example, the API converter 220 converts instructions or commands conforming to a standard API for communicating with the user device to an API for communicating with a corresponding cloud system. Similarly, the API converter 220 converts instructions or commands conforming to an API for communicating with a corresponding cloud system to a standard API for communicating with the user device. In one aspect, different APIs employed by different cloud systems and/or associations between syntaxes of different APIs are stored by the API store 225. In one approach, the API converter 220 receives, from the communication interface 210, instructions or commands represented in the standard API or an API conforming to a particular cloud system. The API converter 220 may identify the cloud system to establish communication with based on the mapping table stored by the mapping store 215. In addition, the API converter 220 may identify the corresponding API associated with the identified cloud system based on the API store 225, and converts instructions or commands in the standard API to the identified API or the identified API to the standard API. The API converter 220 forwards the converted instructions or commands to the communication interface 210 for transmission through the network 135.

The SDK converter 230 is a component that converts instructions or commands in different SDK packages. For example, the SDK converter 230 converts instructions or commands conforming to a standard SDK package for communicating with the user device to a SDK package for communicating with a corresponding cloud system. Similarly, the SDK converter 230 converts instructions or commands conforming to a SDK package for communicating with a corresponding cloud system to a standard SDK package for communicating with the user device. In one aspect, different SDK packages employed by different cloud systems and/or associations between syntaxes of different SDK packages are stored by the SDK store 235. In one approach, the SDK converter 230 receives, from the communication interface 210, instructions or commands represented in the standard SDK package or a SDK package conforming to a particular cloud system. The SDK converter 230 may identify the cloud system to establish communication with based on the mapping table stored by the mapping store 215. In addition, the SDK converter 230 may identify the corresponding SDK package associated with the identified cloud system based on the SDK store 235, and converts instructions or commands in the standard SDK package to the identified SDK package or the identified SDK package to the standard SDK package. The SDK converter 230 forwards the converted instructions or commands to the communication interface 210 for transmission through the network 135.

The metadata converter 240 is a component that converts metadata associated with a virtual machine in different metadata formats. For example, the metadata convert 240 converts metadata associated with a virtual machine conforming to a standard metadata format employed by the user device to metadata conforming to a corresponding metadata format employed by a cloud system. In one aspect, different metadata formats employed by different cloud systems and/or associations between syntaxes of different metadata formats are stored by the metadata format store 245. In one approach, the metadata converter 240 receives, from the communication interface 210, metadata associated with a virtual machine represented in the standard metadata format or a metadata format conforming to a particular cloud system. The metadata converter 240 may identify the cloud system to establish communication with based on the mapping table stored by the mapping store 215. In addition, the metadata converter 240 may identify the corresponding metadata format associated with the identified cloud system based on the metadata format store 245, and converts metadata in the standard metadata format to the identified metadata format employed by the cloud system or the identified metadata format employed by the cloud system to the standard metadata format. The metadata converter 240 forwards the converted metadata to the communication interface 210 for transmission through the network 135.

Figure 3:
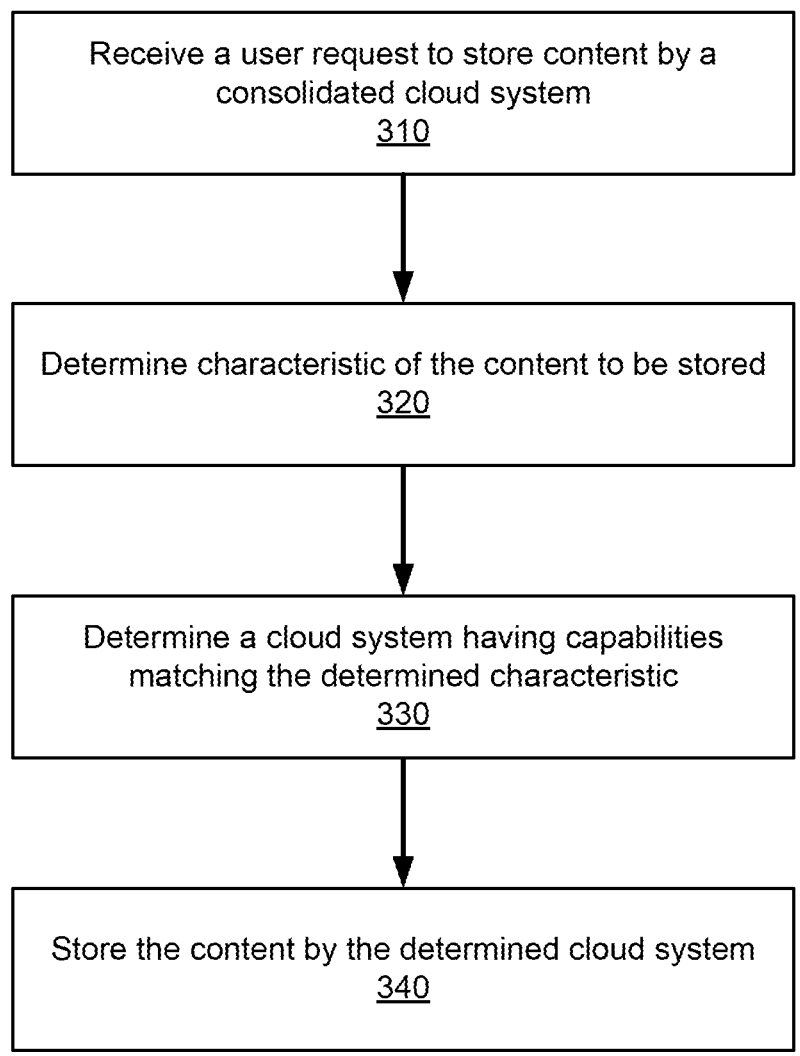
FIG. 3 is an example flowchart showing a process for storing content to a consolidated cloud system, in accordance with some embodiments of the present disclosure.

Referring to FIG. 3, illustrated is an example flowchart describing a process 300 for storing content to a consolidated cloud system, in accordance with some embodiments of the present disclosure. The process 300 may be performed by the interface cloud system 200. In other embodiments, the process 300 may be performed by other entities. In other embodiments, the process 300 includes more, fewer, or different operations than shown in FIG. 3.

The interface cloud system 200 receives 310 a user request, from a user device operated by a user, to store content by a consolidated cloud system. The content may be virtual machine images, metadata associated with virtual machines, or volume data associated with virtual machine. The consolidated cloud system may include various cloud systems operated by different entities and operate based on different formats (e.g., APIs, SDKs, metadata format, protocols, etc.). The user device generating the user request may be unaware of which cloud system stores the content. Rather, content may appear to be stored by single cloud system to the user device. The interface cloud system 200 may receive the user request in a standard format employed by the user device.

The interface cloud system 200 determines 320 characteristics or specification of the content to be stored. Example characteristics or specification of the content include an identification of a user device, geographical region of the user device, network speed, data size of content, operating speed requirements, data format, type of content, etc.

The interface cloud system 200 determines 330 one or more cloud systems, from the various cloud systems, having capabilities matching the determined characteristics, and stores 340 the content by the identified one or more cloud systems. The interface cloud system 200 may convert the instructions or data represented in the standard format (e.g., API, SDK package, metadata, etc.) for communicating with the user device into a format conforming to the identified one or more cloud systems, and instructs the identified cloud systems to store the requested content in the format employed by the identified cloud systems.

Figure 4:
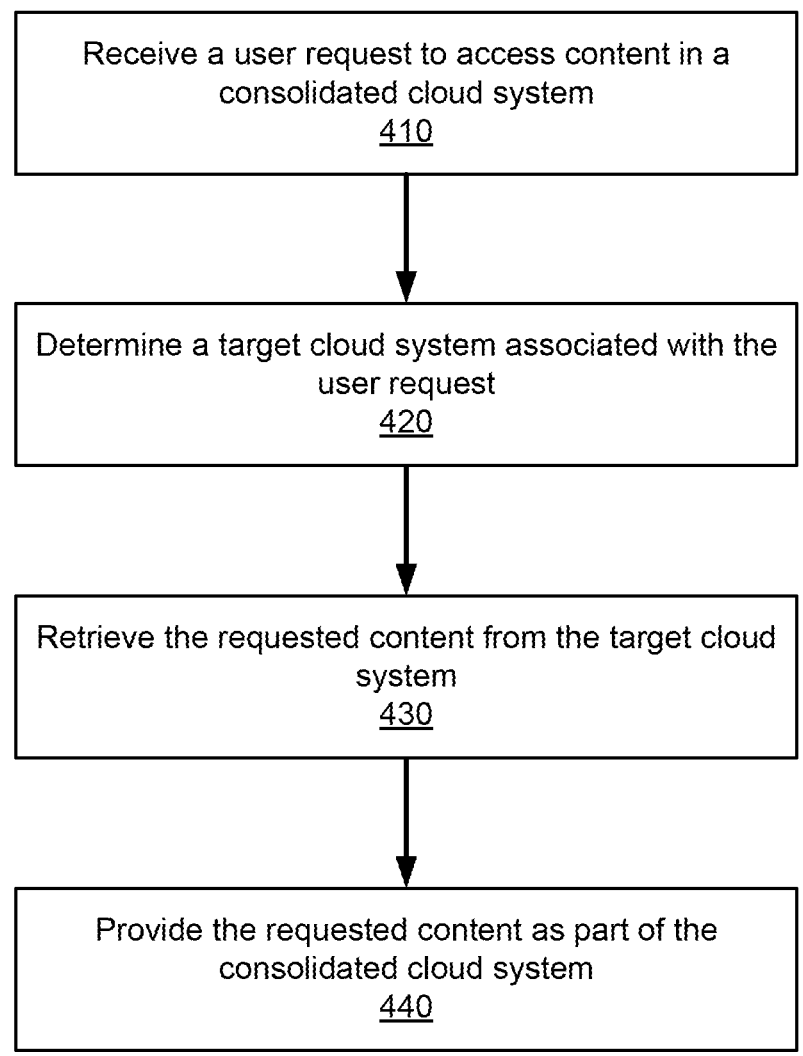
FIG. 4 is an example flowchart showing a process for allowing an access to a consolidated cloud system, in accordance with some embodiments of the present disclosure.

Referring to FIG. 4, illustrated is an example flowchart showing a process 400 for allowing an access to a consolidated cloud system, in accordance with some embodiments of the present disclosure. The process 400 may be performed by the interface cloud system 200. In other embodiments, the process 400 may be performed by other entities. In other embodiments, the process 400 includes more, fewer, or different operations than shown in FIG. 4.

The interface cloud system 200 receives 410 a user request, from a user device operated by a user, to access content in a consolidated cloud system. The interface cloud system 200 may receive the user request in a standard format employed by the user device.

The interface cloud system 200 determines 420 a target cloud system associated with the user request. Based on the mapping table, the interface cloud system 200 may identify which cloud system stores which content.

The interface cloud system 200 retrieves 430 the requested content from the target cloud system, and provides 440 the requested content as part of the consolidated cloud system. In one approach, the interface cloud system 200 retrieves the requested content in a format (e.g., API, SDK package, metadata, etc.) employed by the target cloud system into a standard format for communicating with the user device, and forwards the converted content to the user device.

Figure 5:
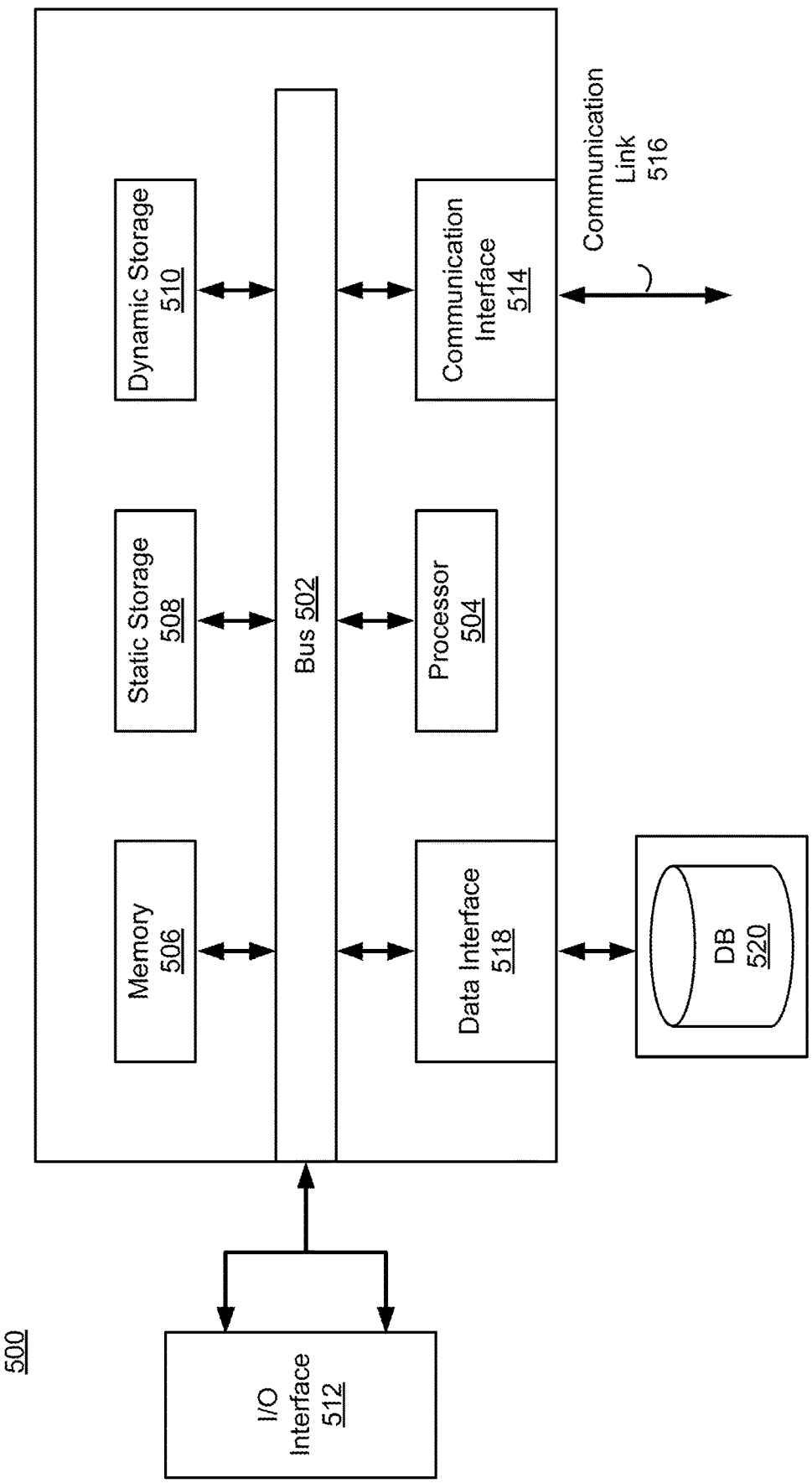
FIG. 5 illustrates a block diagram of a computing system suitable for implementing particular embodiments disclosed herein.

Referring to FIG. 5, illustrated is a block diagram of an illustrative computing system 500 suitable for implementing particular embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa. Moreover, reference to a computer system may encompass one or more computer systems.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Computer system 500 may include one or more computer systems 500; be unitary or distributed; span multiple locations; span multiple machines; span multiple data centers; or reside in a cloud, which may include one or more cloud components in one or more networks. One or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein.

In some embodiments, the computer system 500 includes a bus 502 (e.g., an address bus and a data bus) or other communication mechanism for communicating information, which interconnects subsystems and devices, such as processor 504, memory 506 (e.g., RAM), static storage 508 (e.g., ROM), dynamic storage 510 (e.g., magnetic or optical), communication interface 514 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 512 (e.g., keyboard, keypad, mouse, microphone). In particular embodiments, computer system 500 may include one or more of any such components.

In particular embodiments, processor 504 includes hardware for executing instructions, such as those making up a computer program. As an example and not by way of limitation, to execute instructions, processor 504 may retrieve (or fetch) the instructions from an internal register, an internal cache, memory 506, static storage 508, or dynamic storage 510; decode and execute them; and then write one or more results to an internal register, an internal cache, memory 506, static storage 508, or dynamic storage 510. In particular embodiments, processor 504 may include one or more internal caches for data, instructions, or addresses. This disclosure contemplates processor 504 including any suitable number of any suitable internal caches. As an example and not by way of limitation, processor 504 may include one or more instruction caches, one or more data caches, and one or more translation lookaside buffers (TLBs). Instructions in the instruction caches may be copies of instructions in memory 506, static storage 508, or dynamic storage 510, and the instruction caches may speed up retrieval of those instructions by processor 504. Data in the data caches may be copies of data in memory 506, static storage 508, or dynamic storage 510 for instructions executing at processor 504 to operate on; the results of previous instructions executed at processor 504 for access by subsequent instructions executing at processor 504 or for writing to memory 506, static storage 508, or dynamic storage 510; or other suitable data. The data caches may speed up read or write operations by processor 504. The TLBs may speed up virtual-address translation for processor 504. In particular embodiments, processor 504 may include one or more internal registers for data, instructions, or addresses. This disclosure contemplates processor 504 including any suitable number of any suitable internal registers. Processor 504 may include one or more arithmetic logic units (ALUs); be a multi-core processor; or include one or more processors 504. Although this disclosure describes and illustrates a particular processor, this disclosure contemplates any suitable processor.

In particular embodiments, I/O interface 512 includes hardware, software, or both, providing one or more interfaces for communication between computer system 500 and one or more I/O devices. Computer system 500 may include one or more of these I/O devices. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 512 for them. I/O interface 512 may include one or more device or software drivers enabling processor 504 to drive one or more of these I/O devices. I/O interface 512 may include one or more I/O interfaces 512. Although this disclosure describes and illustrates a particular I/O interface, this disclosure contemplates any suitable I/O interface.

In particular embodiments, communication interface 514 includes hardware, software, or both providing one or more interfaces for communication (such as, for example, packet-based communication) between computer system 500 and one or more other computer systems 500 or one or more networks. As an example and not by way of limitation, communication interface 514 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 514 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 514 for any of these networks. Communication interface 514 may include one or more communication interfaces 514. Although this disclosure describes and illustrates a particular communication interface, this disclosure contemplates any suitable communication interface.

One or more memory buses (which may each include an address bus and a data bus) may couple processor 504 to memory 506. Bus 502 may include one or more memory buses, as described below. In particular embodiments, one or more memory management units (MMUs) reside between processor 504 and memory 506 and facilitate accesses to memory 506 requested by processor 504. In particular embodiments, memory 506 includes random access memory (RAM). This RAM may be volatile memory, dynamic RAM (DRAM) or static RAM (SRAM). Moreover, this RAM may be single-ported or multi-ported RAM. This disclosure contemplates any suitable RAM. Memory 506 may include one or more memories 506. Although this disclosure describes and illustrates particular memory, this disclosure contemplates any suitable memory.

The ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 510 may include a hard disk drive (HDD), a floppy disk drive, flash memory, an optical disc, a magneto-optical disc, magnetic tape, or a Universal Serial Bus (USB) drive or a combination of two or more of these. Dynamic storage 510 may include removable or non-removable (or fixed) media. Dynamic storage 510 may be internal or external to computer system 500. This disclosure contemplates mass dynamic storage 510 taking any suitable physical form. Dynamic storage 510 may include one or more storage control units facilitating communication between processor 504 and dynamic storage 510.

In particular embodiments, bus 502 includes hardware, software, or both coupling components of computer system 500 to each other. As an example and not by way of limitation, bus 502 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 502 may include one or more buses. Although this disclosure describes and illustrates a particular bus, this disclosure contemplates any suitable bus or interconnect.

In some embodiments, computer system 500 performs specific operations by processor 504 executing one or more sequences of one or more instructions contained in memory 506. Such instructions may be read into memory 506 from another computer readable/usable medium, such as static storage 508 or dynamic storage 510. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 504 for execution. Such a medium may take many forms, including but not limited to, nonvolatile media and volatile media. Non-volatile media includes, for example, optical or magnetic disks, such as static storage 508 or dynamic storage 510. Volatile media includes dynamic memory, such as memory 506.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 500; in alternative embodiments, two or more computer systems 500 coupled by communication link 516 (e.g., LAN, PTSN, or wireless network) may perform the sequence of instructions in coordination with one another.

Computer system 500 may transmit and receive messages, data, and instructions, including program, i.e., application code, through communication link 516 and communication interface 514. Received program code may be executed by processor 504 as it is received, and/or stored in static storage 508 or dynamic storage 510, or other non-volatile storage for later execution. A database 520 may be used to store data accessible by the system 500 by way of data interface 518.

Herein, a non-transitory computer readable medium (also referred to as "computer-readable non-transitory storage medium") includes instructions, when executed, cause a processor to execute various functionalities described herein. In some embodiments, a computer-readable non-transitory storage medium or media may be embodied as one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A non-transitory computer readable medium comprising instructions when executed by a processor cause the processor to:

receive a user request in a request format to access content in a consolidated cloud system that is associated with a plurality of cloud systems, wherein the request format is suitable for communicating with a user device from which the user request is generated;

identify a first cloud system storing a first portion of the content in a first format and identifying a second cloud system storing a second portion of the content in a second format;

convert the user request from the request format to the first format that is suitable for communicating with the first cloud system and convert the request format to a second format that is suitable for communicating with the second cloud system;

retrieve the first portion of the content from the first cloud system in accordance with the first format and the second portion of the content from the second cloud system in accordance with the second format; and provide the first portion and the second portion of the content in response to the user request in the request format.

2. The non-transitory computer readable medium of claim 1, wherein the request format of the user request is not dependent upon which cloud system of the plurality of cloud systems stores the content.

3. The non-transitory computer readable medium of claim 1, wherein the processor further identifies a target cloud system based on a mapping table indicating which cloud systems store which contents.

4. The non-transitory computer readable medium of claim 1, wherein the user request does not identify that the first portion is stored in the first cloud system and the second portion is stored in the second cloud system.

5. The non-transitory computer readable medium of claim 1, wherein the request format corresponds to a request application programming interface associated with the user device and the first format corresponds to a first application programming interface associated with the first cloud system.

6. The non-transitory computer readable medium of claim 1 wherein the first format corresponds to a first software defined kit package and the second format corresponds to a second software defined kit package.

7. The non-transitory computer readable medium of claim 1 wherein the processor further:

receives another user request to store second content in the consolidated cloud system, wherein the another user request is in the request format; and determine a characteristic of the second content to be stored.

8. The non-transitory computer readable medium of claim 7 wherein the processor further:

identifies a target cloud system from the plurality of cloud systems having capability matching the characteristic; and convert the another user request from the request format into a target format.

9. The method of claim 1, wherein the first format and the second format are different.

10. The method of claim 1, wherein identify a first cloud system comprises determining characteristics or specification of content to be stored.

11. A method comprising:

receiving, by a consolidated cloud system, a user request in a request format to access content in a consolidated cloud system that is associated with a plurality of cloud systems, wherein the request format is suitable for communicating with a user device from which the user request is generated;

identifying, by the consolidated cloud system, a first cloud system storing a first portion of the content in a first format and identifying a second cloud system storing a second portion of the content in a second format;

converting, by the consolidated cloud system, the user request from the request format to the first format that is suitable for communicating with the first cloud system and convert the request format to a second format that is suitable for communicating with the second cloud system;

retrieving, by the consolidated cloud system, the first portion of the content from the first cloud system in accordance with the first format and the second portion of the content from the second cloud system in accordance with the second format; and providing, by the consolidated cloud system, the first portion and the second portion of the content in response to the user request in the request format.

12. The method of claim 11, wherein the request format of the user request is not dependent upon which cloud system of the plurality of cloud systems stores the content.

13. The method of claim 11, further comprising determining, by the consolidated cloud system, a target cloud system according to a mapping table indicating which cloud systems store which contents.

14. The method of claim 11, wherein the user request does not identify that the first portion is stored in the first cloud system and the second portion is stored in the second cloud system.

15. The method of claim 11, wherein the request format corresponds to a request application programming interface associated with the user device and the first format corresponds to a first application programming interface of the first cloud system.

16. The method of claim 11 wherein the first format corresponds to a first software defined kit package associated with the user device and the second format corresponds to a second software defined kit package.

17. The method of claim 11, further comprising:
receiving, by the consolidated cloud system, another user request in the request format to store second content in the consolidated cloud system; and
determining, by the consolidated cloud system, a characteristic of the second content to be stored.

18. The method of claim 17, further comprising:
determining, by the consolidated cloud system, a target cloud system from the plurality of cloud systems having capability matching the characteristic; and
converting, by the consolidated cloud system, the another user request from the request format into a target format.

19. An apparatus comprising:
a processor; and
a non-transitory compute readable medium comprising instructions when executed by the processor cause the processor to:
receive a user request in a request format to access content in a consolidated cloud system that is associated with a plurality of cloud systems, wherein the request format is suitable for communicating with a user device from which the user request is generated;

identify a first cloud system storing a first portion of the content in a first format and identifying a second cloud system storing a second portion of the content in a second format;

convert the user request from the request format to the first format that is suitable for communicating with the first cloud system and convert the request format to a second format that is suitable for communicating with the second cloud system;

retrieve the first portion of the content from the first cloud system in accordance with the first format and the second portion of the content from the second cloud system in accordance with the second format; and provide the first portion and the second portion of the content in response to the user request in the request format.

20. The apparatus of claim 19, wherein the request format of the user request is not dependent upon which cloud system of the plurality of cloud systems stores the content.

21. A non-transitory computer readable media with computer-executable instructions embodied thereon that, when executed by a processor of a consolidated cloud system, cause the consolidated cloud system to perform a process comprising:
receiving a user request in a request format to store content, wherein the request format is suitable for communicating with a user device from which the user request is generated;

identifying a first cloud system storing a first portion of the content in a first format based on operating requirements associated with the first portion of the content and identifying a second cloud system storing a second portion of the content in a second format based on operating requirements associated with the second portion of the content;

converting the user request from the request format to the first format that is suitable for communicating with the first cloud system and convert the request format to a second format that is suitable for communicating with the second cloud system; and storing the first portion and the second portion of the content within the first cloud system and the second cloud system.

22. The non-transitory computer readable media of claim 21, further comprising:
identifying a characteristic of the content; and
determining a target cloud system as having capability matching the characteristic.

23. The non-transitory computer readable media of claim 21, wherein the request format is independent of a format that is used by the plurality of cloud systems.

24. The non-transitory computer readable medium of claim 8 wherein the processor further stores the second content in the target cloud system in accordance with the target format.

25. The method of claim 18, further comprising:
storing, by the consolidated cloud system, the second content in the target cloud system in accordance with the target format.

26. The method of claim 10, wherein the characteristics include an identification of a user device, geographical region of the user device, network speed, data size of content, operating speed requirements, data format, or type of content.

* * * * *